United States Patent [19]

Tang

[11] Patent Number: 5,532,523
[45] Date of Patent: Jul. 2, 1996

[54] UNINTERRUPTIBLE POWER SYSTEM

[75] Inventor: Yu-Chang Tang, Taipei, Taiwan

[73] Assignee: Sysgration Ltd., Taipei, Taiwan

[21] Appl. No.: 237,935

[22] Filed: May 4, 1994

[51] Int. Cl.[6] .................................................. H02J 7/00
[52] U.S. Cl. ................................ 307/64; 307/66; 364/492
[58] Field of Search ......................... 307/64, 66; 364/480, 364/492

[56] References Cited

U.S. PATENT DOCUMENTS

| | | | |
|---|---|---|---|
| 4,520,275 | 5/1985 | Marusik | 307/64 |
| 4,827,151 | 5/1989 | Okado | 307/66 |
| 4,916,329 | 4/1990 | Dang et al. | 307/66 |
| 5,315,533 | 5/1994 | Stich et al. | 364/480 |

Primary Examiner—William M. Shoop, Jr.
Assistant Examiner—Marlon Fletcher
Attorney, Agent, or Firm—Bacon & Thomas

[57] ABSTRACT

An improved uninterruptible power system including a UPS auto off circuit, a current limit protecting circuit, a power on overload protecting circuit, a simple charging circuit, a relay driver circuit, an external power voltage detecting circuit, a driver circuit, and a synchronizing circuit.

1 Claim, 3 Drawing Sheets

UNINTERRUPTIBLE POWER SYSTEM

BACKGROUND OF THE INVENTION

The present invention relates to an uninterruptible power system (UPS), and more particularly to an improved uninterruptible power system for critical machinery.

At present, uninterruptible power systems are widely used in a variety of situations in which problems will occur if the power is cut suddenly. For example, in a computer, when the power is unexpectedly cut, much data will be lost. Consequently, numerous types of uninterruptible power systems have been developed for solving this problem. However, the circuit designs of conventional UPS are not satisfactory.

SUMMARY OF THE INVENTION

It is therefore a primary object of the present invention to provide an improved uninterruptible power system with satisfactory circuit design.

The present invention can be best understood through the following description and accompanying drawings.

DETAILED DESCRIPTION OF THE PREFERRED EMBODIMENT

Figure 1:
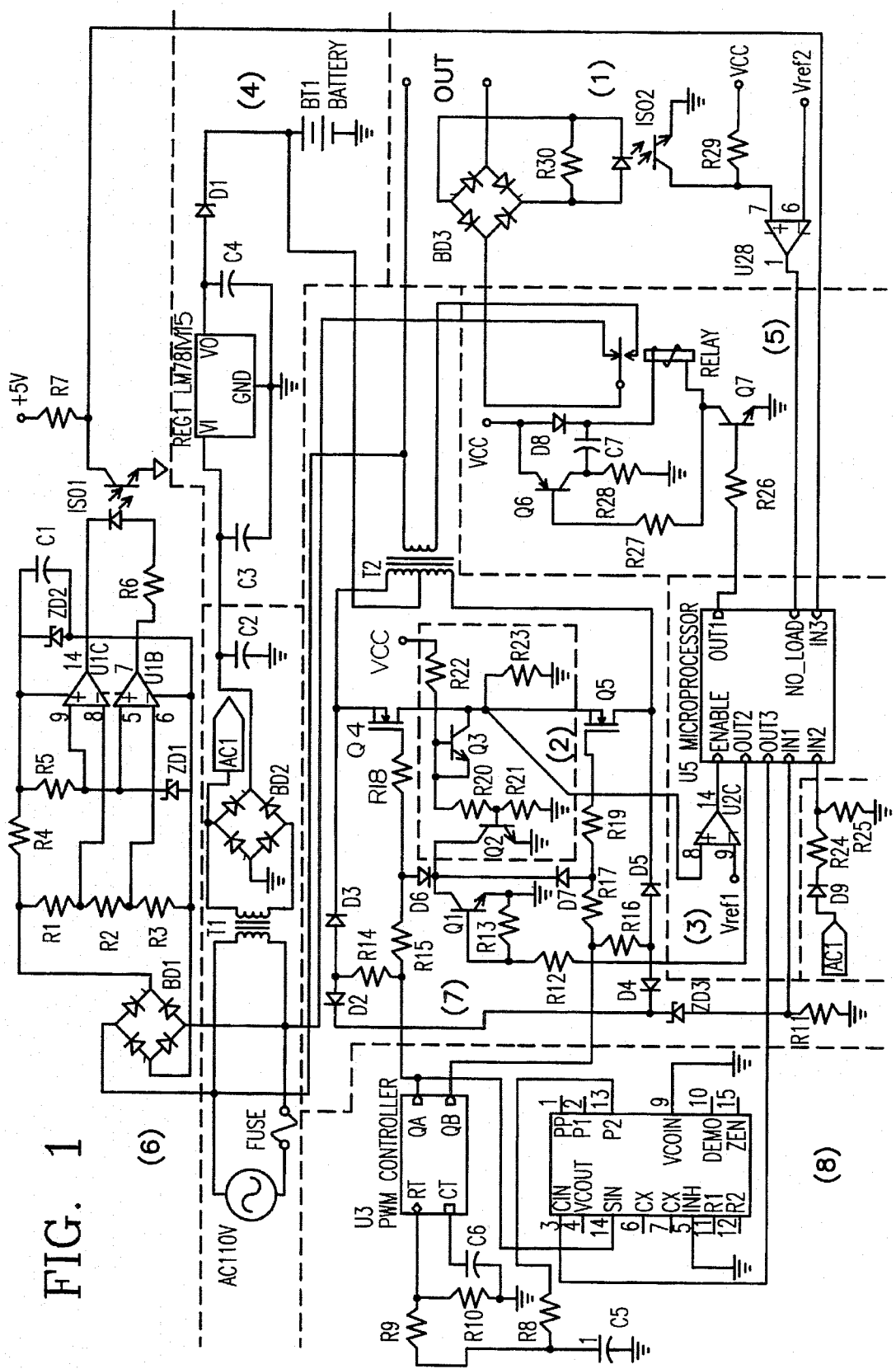
FIG. 1 is a circuit diagram of the present invention.

Please refer to FIG. 1. The uninterruptible power system of the present invention includes a UPS auto off circuit 1 which detects whether there is no load and, if so, automatically shuts off the UPS for saving energy and prolonging the useful life of the battery. A current limit protecting circuit 2 is included to protect a drive transistor from being permanently damaged due to suddenly increased load and a power-on overload protecting circuit 3 is included which, according to the output of the UPS at the time of powering on, first detects whether the load at the output end is too large and then detects whether the normal operation should be continued or the output should be stopped so as to protect the fuse at the input end of the external power from permanent damage due to excessive load. Additional features include a simple charging circuit 4 which ensures that a chargeable lead battery is charged within a safe range so as to prolong the useful life of the battery, a relay driver circuit 5 for increasing the activating speed of a relay and an external power voltage detecting circuit 6 which detects whether the external power voltage is too low or too high for protecting the computer from being permanently damaged. Finally, also included are a driver circuit 7 which, when a transistor is turned on, works within a safe range to detect whether the power loaded on the transistor is under the given value so as to avoid permanent damage; and a synchronizing circuit 8 which uses a phase locked loop (PLL) interlocking circuit to synchronize the UPS output with the external power.

Figure 2:
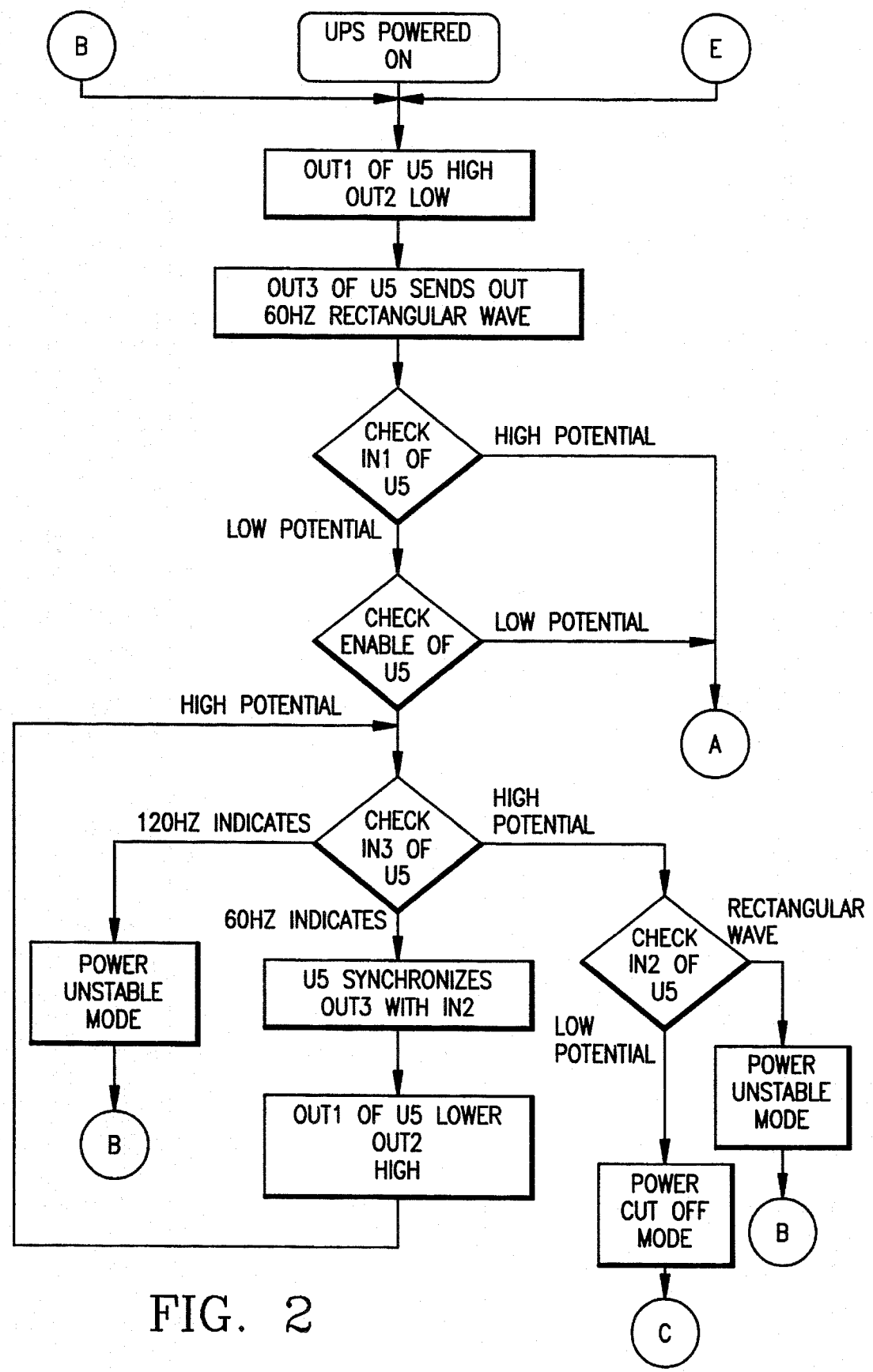
FIG. 2 is a flow chart of the operation of the present invention.
Figure 3:
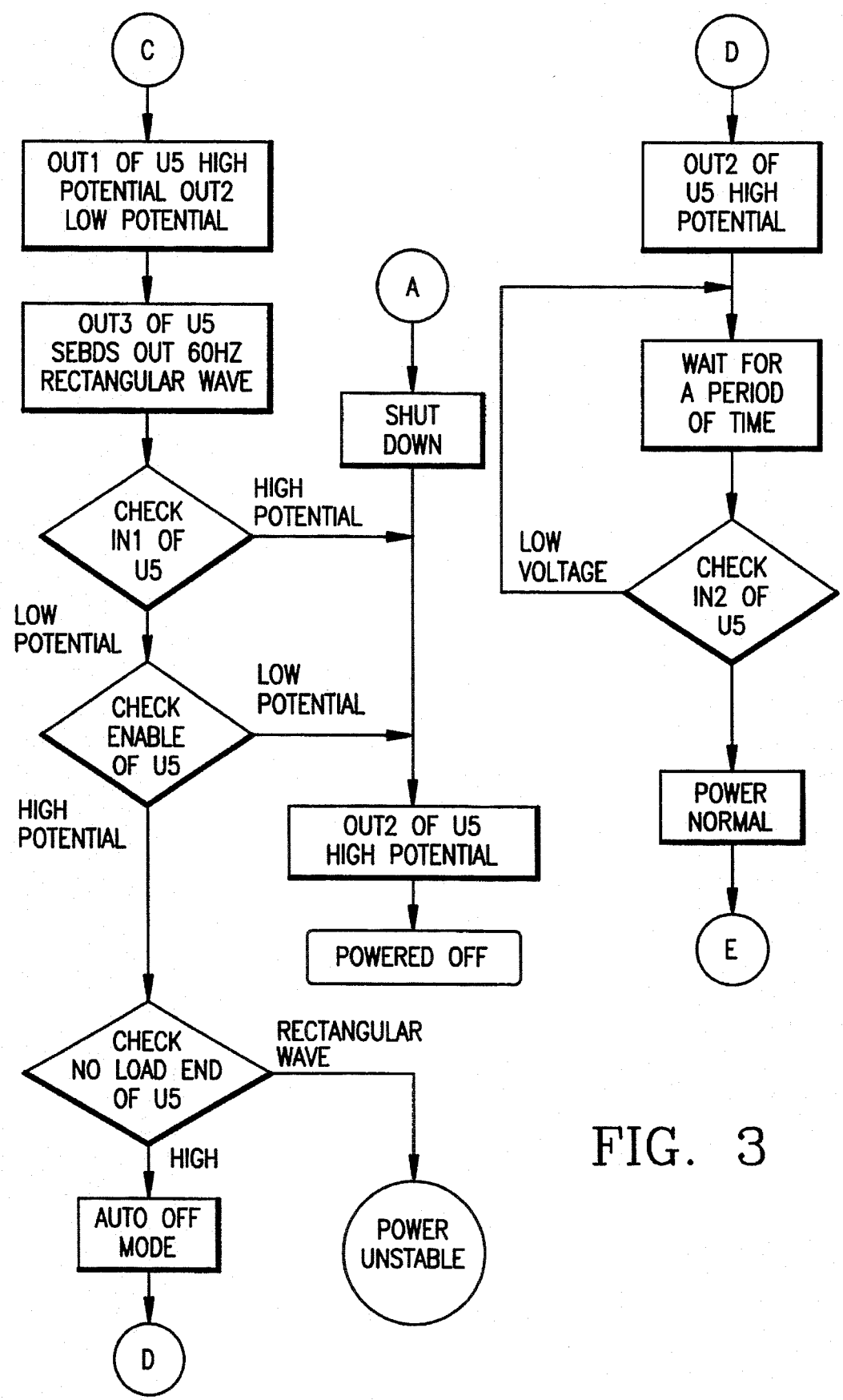
FIG. 3 is also a flow chart of the operation of the present invention.

Please refer to FIGS. 2 and 3 together with FIG. 1. The operation of each circuit will be described in detail as follows: with respect to the UPS auto off circuit 1, when the external power is cut off and the output end OUT is connected to a load, the output of the transformer T2 is switched by the relay RELAY of circuit 5 to be connected to the bridge rectifier BD3 and to the output end OUT (circuit 5 is described below). The bridge rectifier BD3 draws the current from the output of transformer T2 to pass through the resistor R30 and the LED of the light coupler ISO2. The transistor of the light coupler ISO2 is thus turned on, making the potential of pin 7 of the comparator U2B lower than that of pin 6 thereof, pin 6 being connected to a reference voltage Vref 2. Pin 1 of the comparator U2B then outputs a low potential and after the microprocessor U5 detects this, the output end OUT2 is caused to have low potential, in turn causing the driver circuit 7 to have a continuous output to the transformer T2 and to output OUT.

In contrast, when the external power is cut off, and the output end OUT is not loaded, the output of the transformer T2 is switched by the relay RELAY to connect to the bridge rectifier BD3 and to the output end OUT, but the bridge rectifier BD3 is unable to draw any current so that the LED of the light coupler ISO2 cannot be lit up. The transistor of the light coupler ISO2 is not turned on, making the potential of pin 7 of the comparator U2B higher than that of pin 6 (Vref 2) thereof. Pin 1 of the comparator U2B outputs a high potential and after the microprocessor U5 detects this, the output end OUT2 is caused to have a high potential, turning on transistor Q1. The gates GATE of the transistors Q4, Q5 are thus connected to low potential through the diodes D6, D7, preventing the transistors Q4, Q5 from being turned on, and thus the transformer T2 will not have an output. This means that the UPS is turned off for saving energy and prolonging the useful life of the battery.

With respect to the current limit protecting circuit 2, the transistor Q2 is identical to the transistor Q3 and the base-to-emitter voltage (VBE) of the transistor Q2 is provided by the voltage divider made up of the resistors R20, R21. The base voltage (VB) of the transistor Q3 is achieved by adding the voltage across resistor R23 to the base-emitter voltage of transistor Q2 so that if the voltage drop across resistor R23 is too high, the base voltage of the transistor Q3 will rise correspondingly. As long as the voltage dividing of the resistors R20, R21 causes the voltage across resistor R21 to be larger than the base-emitter voltage of the transistor Q2, the transistor Q2 will turn on the diodes D6, D7, making the voltage of the gates of the transistors Q4, Q5 lower and making the drain-source current of the transistors Q4, Q5 decrease.

Normally, the load of the output end OUTPUT is within an allowed range and the current passing through the transistors Q4, Q5 also passes through the resistor R23. The voltage drop across resistor R23 plus the base-emitter voltage of the transistor Q3 is insufficient to make the transistor Q2 so that the transistors Q4, Q5 are still normally continuously turned on. If the load of the output end OUTPUT is too large and coupled to the primary end of T2, making the current passing through the transistors Q4, Q5 too high, and if the voltage drop across resistor R23 plus the base-emitter voltage of the transistor Q3 is too high, turning on transistor Q2, the current of the drain-source of the transistors Q4, Q5 immediately decreases so as to protect the driver transistors from being permanently damaged due to suddenly increased load.

With respect to the power-on-overload protecting circuit 3, when powered on, the output pin OUT1 of the microprocessor U5 first outputs a high potential and the relay RELAY switches the output end OUTPUT of transformer T2 to the output, at which time circuit 3 detects whether the load of the output end is too large. If the load of OUTPUT is within the allowed range and the current passing through the transistors Q4, Q5 also passes through the resistor R23, the produced voltage drop across resistor R23 is connected to the pin 8 of the comparator U2C and is lower than the reference voltage (Vref 1) connected to the pin 9, so that the output of the pin 14 is at a high potential and connected to he ENABLE end of the microprocessor, making the OUT2 end thereof output a low potential. At this time, the transistor Q1 is not turned on and thus the transistors Q4, Q5 continue to operate normally.

After the detection period of the microprocessor US, the OUT1 end outputs a low potential and the relay RELAY switches the output end OUT to the external power source. Then the output pin OUT2 of processor U5 outputs a high potential to turn on the transistor Q1, This means the driver circuit 7 is turned off. When powered on, if the load at the OUTPUT is too large and coupled to the primary end of transformer T2, making the current passing through the transistors Q4, Q5 too large, the voltage drop across resistor R23 is connected to the pin 8 of the comparator U2C and is higher than the reference voltage Vref 1 connected to the pin 9, so that the output of the pin 14 is at a low potential and connected to the ENABLE end of the microprocessor, making the OUT2 end thereof output a high potential. At this time, the transistor Q1 is turned on, the driver circuit is turned off, the output pin OUT1 of the microprocessor U5 continuously outputs a high potential, and the relay RELAY continues to connect the output end OUT to output transformer T2. Because the driver circuit is turned off, no voltage is output from the output end so as to protect the fuse at the input end of the external power source from being damaged.

With respect to the simple charging circuit 4, the external power AC110 V is voltage-decreased by the transformer T1 and rectified by the bridge rectifier BD1 to be filtered by the capacitor C2 into DC voltage, with 15 V being output by the voltage-stabilizer REG1 to pass through the diode D1 and be decreased into 14.3 V to charge the battery B1. The internal current of the stabilizer REG1 is limited to 0.6 A and the stabilizer REG1 is provided with an inner temperature protecting device so-that when the temperature is too high, the output current is decreased so as to avoid too large a charging current under too high temperature, thus achieving the effects of voltage limiting, current limiting and temperature protection to prolong the useful life of the battery.

With respect to the relay driver circuit 5, normally the voltage supplied to the relay is specified and the switching speed is about 10 ms to 40 ms. In a UPS, such a switching speed is too slow and the speed of the relay must be increased within the allowed operation range. The best way is to instantly increase the current and maintain the current to be within the specified range. Normally, the OUT1 end of the microprocessor U5 has a low potential. When the transistor Q7 is not turned on, no current will pass through the resistor R27 and thus the transistor Q6 is not turned on. A current will pass through the diodes D8 and resistor R28 to charge the capacitor C7 until the same is fully charged. Because almost no current passes through the resistor R28, at this time the two ends of the capacitor C7 have a voltage corresponding to that of voltage source VCC.

When the output pin OUT1 of the microprocessor U5 outputs a high potential, the transistor Q7 is turned on and the collector pin C thereof is effectively grounded. At this time, a current passes through the resistor R27 so that the transistor Q6 is also turned on and the voltage of the collector pin C thereof is about equal to voltage VCC. At this time, because the two ends of the capacitor C7 store the voltage corresponding to VCC, the + end of the capacitor C7 is equal to the voltage across resistor R28 plus the capacitor voltage, and approximately equals voltage VCC plus VCC–2 Vcc. Therefore, the coil of the relay RELAY is supplied with double voltage so that the current is increased and the speed of the relay RELAY is accordingly increased. After the charge of the capacitor C7 is totally discharged through the coil of the relay RELAY, the transistor Q7, and resistor R28, the voltage of the two ends of the relay RELAY quickly restores to Vcc minus the voltage across diode D8. Because the voltage drop of the diode D8 is only 0.6 V, the voltage of the two ends of the relay RELAY is about Vcc and the necessary increase in speed can be safely achieved.

With respect to the external power voltage detecting circuit 6, the peak value of the external power AC110Vrms is about 150 V. This voltage is full wave rectified by the bridge rectifier BD1 and is stabilized by zener diode 2 and resistor R4, and filtered by the capacitor C1 to provide power for the comparator. The positive ends of the comparators U1B, U1C are stabilized by the zener diode ZD1 and due to the voltage dividing of the resistors R1, R2, R3, the voltage of pin 8 of the comparator U1C is higher than that of pin 6 of the comparator U1B so that the voltage of pin 8 of the comparator U1C is likely to be higher than that output by zener diode ZD1.

When the peak value of the external power is too low, due to the voltage dividing of the resistors R1, R2, R3, the sum of the voltage drops across resistors R2 and R3 is lower than the voltage supplied by zener diode ZD1 so that output ends of the comparators U1B, U1C both have high potential and the LED of the light coupler ISO1 will not be lit up and the transistor of the light coupler ISO1 will not be turned on, the IN3 pin of the microprocessor U5 inputs a high potential, and it is thereby detected that the external power input is too low. When the external power is normal, during any period of time, the peak voltage of the external power is divided by the resistors R1, R2, R3 so that the sum of the voltage drops across resistors R2 and R3 is higher than the voltage of zener diode ZD1 while the voltage across resistor R3 is lower than the voltage output by diode Zd1, so that the comparator U1C outputs a low voltage and the comparator U1B outputs a high potential, at which time the LED of the light coupler ISO1 will be lit up and the transistor thereof will be turned on, causing pin IN3 of the microprocessor U5 to input a lower potential so that during a long period of time, the input signal of the input pin IN3 of the microprocessor U5 is a double rectangular wave at the frequency of the external power and it is detected that the external power input is normal.

When the external power is too high, during any period of time, the peak voltage of the external power is divided by the resistors R1, R2, R3 so that the sum of the voltage drops across resistors R2 and R3 is higher than the voltage of zener diode ZD1 and the voltage drop across resistor R3 is higher than the voltage of zener diode ZD1, so that the comparator U1B outputs a low potential, the LED of the light coupler ISO1 is turned off, the transistor thereof is not turned on, and the pin IN3 of the microprocessor U5 again inputs high potential so that during a long period of time, the input signal of the IN3 end of the microprocessor U5 is the quadruple rectangular wave at the frequency of the external power and it is detected that the external power input is too high.

With respect to the driver circuit 7, the transistors Q4, Q5 are push-pull circuits and symmetrical so that the diodes D2, D3 and resistor R14 are equal to diodes D4, D5 and resistor R16 and the diodes D2, D3 are identical diodes. When operating normally, the QA output of pulse width modulator (PWM) U3 is at high potential and the transistor Q4 is turned on. The voltage Vds of transistor Q4 plus the voltage drop across resistor R23 is lower than the break voltage V (ZD3) of the diode ZD3 so that the diode ZD3 is not turned on and no voltage drop occurs through the resistor R11. The IN1 pin of the microprocessor U5 inputs a low potential and it is detected that the working is normal. When the operation of U3 is abnormal, the QA output of the pulse width modulator is at a high potential and the transistor Q4 is turned on but the drain to source voltage thereof plus the voltage drop across resistor R23 is higher than the break voltage of the zener diode ZD3 so that the diode ZD3 is turned on and voltage drop occurs through the resistor R11 connected to the IN1 pin of the microprocessor U5, which thereby detects that the operation is abnormal. The OUT2 end of the microprocessor U5 then outputs a high potential to switch off the driver circuit so as to ensure that the driver circuit works within a safe range for protecting the driver circuit.

With respect to the synchronizing circuit 8, external power AC110 V is voltage-decreased by the transformer T1, rectified by the diode D9 and divided by the resistors R24, R25 connected to the IN2 end of the microprocessor U5. When the external power is normal, the microprocessor U5 outputs a synchronous signal according to the phase of the external power and memorizes the frequency of the synchronous signal. When the external power is abnormal, the microprocessor U5 itself outputs a synchronous signal with a fixed frequency to be connected to the CIN end of the phase locked loop (PLL) interlocking integrated circuit IC U4 and the output end QA of the pulse width modulator U3 is connected to the SIN pin of the PLL interlocking IC (U4). The P2 terminal of PLL IC U4 sends out a comparing signal to be integrated by the resistor R8 and capacitor C5 and sent to the RT terminal of the pulse width modulator U3 through the resistor R9. The resistor R10 and the capacitor C6 at the two terminals RT and CT form an RC oscillator so that the oscillating frequency will be affected by the voltage of the RT end. Therefore, when the phase of the QA pin of the pulse width modulator U3 falls behind the synchronous signal output by the microprocessor U5, the P2 pin outputs a high potential to increase the oscillating frequency of the RT and CT terminals. When the phase of the QA pin of the pulse width modulator U3 is in advance of the synchronous signal output by the microprocessor U5, the P2 pin outputs a low potential to decrease the oscillating frequency of the RT and CT terminals so as to achieve the synchronizing effect.

In conclusion, the present invention provides an improved uninterruptible power system including a UPS auto off circuit, a current limit protecting circuit, a power on overload protecting circuit, a simple charging circuit, a relay driver circuit, an external power voltage detecting circuit, a driver circuit, and a synchronizing circuit 8. This uninterruptible power system is able to eliminate various shortcomings existing in convention UPS systems.

It is to be understood that the above description and drawings are only used for illustrating one embodiment of the present invention, and not intended to limit the scope thereof. Any variation and derivation from the above description and drawings should be included in the scope of the present invention.

RT and CT so as to achieve the synchronizing effect.

In conclusion, the present invention provides an improved uninterruptible power system including a UPS auto off circuit, a current limit protecting circuit, a power on overload protecting circuit, a simple charging circuit, a relay driver circuit, an external power voltage detecting circuit, a driver circuit, and a synchronizing circuit 8. This uninterruptible power system is able to eliminate the shortcomings existing in the conventional UPS.

It is to be understood that the above description and drawings are only used for illustrating one embodiment of the present invention, not intended to limit the scope thereof. Any variation and derivation from the above description and drawings should be included in the scope of the present invention.

What is claimed is:

1. An uninterruptible power supply of the type having an input connected to a primary power supply which in turn is connected to output terminals to which a load is to be connected, said power supply also including means for detecting cut-off of the primary power supply and causing a battery to supply power to an output transformer via a transistor driver circuit, comprising:

means including an auto off circuit for detecting whether the uninterruptible power supply is connected to a load and for supplying a signal to a microprocessor which controls a transistor driver circuit to automatically shut off the power supply when no load is present, said auto off circuit being connected between the output terminals of the power supply by a relay upon detection of power failure at the power supply input;

means including a current limiting circuit for protecting the transistor driver circuit;

means including a power on overload protecting circuit connected between the transistor driver circuit and the microprocessor for detecting whether the load at the output terminals is too large and, if the load is too large, disabling the power supply to protect a fuse at the power supply input from permanent damage due to excessive load;

means including a charging circuit for insuring that the battery is charged within a safe range so as to prolong battery life;

means including a relay driver circuit for driving said relay, said relay driver circuit including means for increasing a relay driving voltage in order to increase the switching speed of the relay, said speed increasing means including a relay driving voltage supply and a capacitor for storing addition relay driving voltage prior to activation of the relay;

means including an external power voltage detecting for detecting whether the external power voltage is too low or too high in order to protect said microprocessor; and means including a synchronizing circuit for synchronizing, using a phase locked loop, the primary power supply with an output of said transistor driver circuit.

* * * * *